(12) United States Patent
Han et al.

(10) Patent No.: US 12,005,531 B1
(45) Date of Patent: Jun. 11, 2024

(54) METHOD OF AUTOMATICALLY WELDING WELDED SEAM OF SADDLE LINE FOR SADDLE-TYPE T JOINT

(71) Applicant: Tianjin University, Tianjin (CN)

(72) Inventors: Yongdian Han, Tianjin (CN); Zhaowei Xue, Tianjin (CN); Lianyong Xu, Tianjin (CN); Lei Zhao, Tianjin (CN); Kangda Hao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/475,243

(22) Filed: Sep. 27, 2023

(30) Foreign Application Priority Data

Jan. 17, 2023 (CN) .......................... 202310076472.4

(51) Int. Cl.
*B23K 9/095* (2006.01)
*B23K 9/028* (2006.01)

(52) U.S. Cl.
CPC ............ *B23K 9/0953* (2013.01); *B23K 9/028* (2013.01)

(58) Field of Classification Search
CPC . B23K 9/00; B23K 9/02; B23K 9/028; B23K 9/032; B23K 9/16; B23K 9/127; B23K 9/173; B23K 9/095; B23K 9/0953
See application file for complete search history.

(56) References Cited

U.S. PATENT DOCUMENTS

2017/0217061 A1* 8/2017 Roche ................... B29C 66/742
2020/0147726 A1* 5/2020 Yang .................. B23K 15/0086

FOREIGN PATENT DOCUMENTS

| CN | 102500878 | 6/2012 |
|---|---|---|
| CN | 103111730 | 5/2013 |
| CN | 105772905 | 7/2016 |
| CN | 106624262 | 5/2017 |
| CN | 106735999 | 5/2017 |

(Continued)

OTHER PUBLICATIONS

Yang Zhang, "Research on united planning of welding trajectory and parameters of welding robot for intersecting pipes", Master Thesis for School of Materials Science and Engineering, Tianjin University, Dec. 2018, with English abstract, pp. 1-72.

(Continued)

*Primary Examiner* — Brian W Jennison
(74) *Attorney, Agent, or Firm* — JCIPRNET

(57) ABSTRACT

A method of automatically welding a welded seam of a saddle line for a saddle-type T joint belonging to the technical field of welding is provided, including: establishing a groove cross-sectional model, solving a variation law of a groove cross-sectional area, and planning a welding bead and a welding process parameter according to the groove cross-sectional area; establishing a welding torch pose mathematical model and obtaining a pose homogeneous transformation matrix T of a welding torch; establishing a three-dimensional model of a main pipe and a branch pipe, building a welding system through offline software, importing welding spot pose information, and generating welding torch pose offline command through the offline software; and performing automatic welding of the welded seam of the saddle line for the saddle-type T joint according to the planned welding bead and the welding process parameter and the generated welding torch pose offline command.

5 Claims, 5 Drawing Sheets

(56) References Cited

FOREIGN PATENT DOCUMENTS

| | | |
|---|---|---|
| CN | 106583987 | 5/2018 |
| CN | 108994418 | 12/2018 |
| CN | 109719409 | 5/2019 |
| CN | 109226937 | 11/2020 |
| CN | 113909766 | 1/2022 |
| CN | 114662184 | 6/2022 |
| EP | 0049037 | 4/1982 |
| JP | H1094874 | 4/1998 |

OTHER PUBLICATIONS

De-Zheng Song et al., "Welding Groove Model Analysis of the Intersecting Pipe", Machinery Design & Manufacture, Nov. 2013, with English abstract, pp. 171-174, No. 11.

\* cited by examiner

METHOD OF AUTOMATICALLY WELDING WELDED SEAM OF SADDLE LINE FOR SADDLE-TYPE T JOINT

CROSS-REFERENCE TO RELATED APPLICATION

This application claims the priority benefit of China application serial no. 202310076472.4, filed on Jan. 17, 2023. The entirety of the above-mentioned patent application is hereby incorporated by reference herein and made a part of this specification.

BACKGROUND

Technical Field

The disclosure belongs to the technical field of welding, and more specifically, relates to a method of automatically welding a welded seam of a saddle line for a saddle-type T joint.

Description of Related Art

In the process of pipeline engineering and pressure vessel manufacturing, the saddle-shaped welded seam formed by the vertical pipe-to-pipe or pipe-to-cylinder intersection is a common form of welded seam. At present, for the pipe intersecting structure, manual arc stick welding and carbon dioxide gas shielded welding are used most of the time for welding. However, due to the lack of skilled welders and the high requirements for welding quality and efficiency, robot welding has become the most favorable solution.

A saddle-shaped welded seam is a complex spatial curve, so the groove angle will change with the spatial position, making the angle and depth of the welded seam different in each spatial position. Therefore, the welding torch pose and the welding process parameters are required to be accordingly adjusted during the welding process, so that the difficulty of robot welding increases considerably.

CN109719409A discloses a method for automatically welding annular saddle line intersecting branch pipes. In this method, the intersecting branch pipes are fixed on an annular workpiece positioner for welding. However, the applicability of the use of the positioner is limited, and it is not suitable for some large workpieces that cannot be installed on the positioner or on-site construction. CN113909766A discloses an intersecting line welded seam welding device and method, and CN106583987B discloses a saddle-type welded seam welding device. The above two patents both disclose the welding of saddle line welded seams. However, for different pipe-to-pipe insertion forms and groove shapes, it is still necessary to further plan the welding torch pose and the welding process.

CN109226937B discloses an offline programming method for space intersecting curve welding for an industrial robot. The main normal surface bisection method is used to plan the welding torch pose, but this method is only suitable for the simplest pipe-to-pipe butt joint without grooves. Zhang Yang of Tianjin University provides a joint planning of a welding bead, a welding torch pose, and a welding process for a pipe-to-pipe intersecting welded seam with grooves in his master's degree thesis. However, the thesis focuses on a plug-in T joint, but a saddle-type T joint and a plug-in T joint are two completely different types of joints. Compared to the plug-in joint, the groove cross-section shape of the saddle-type joint is more complex, and the planning for the welding torch pose is more difficult. Song Dezheng et al. analyzed a groove model of a saddle-type T joint in the article "Welding Groove Model Analysis of the Intersecting Pipe" published in Mechanical Design and Manufacturing, 2013 (11). This article is used to guide the processing of the groove of the branch pipe, but does not give the planning of the welding torch pose. It thus can be seen that a method for jointly planning a welding bead, a welding torch pose, and a welding process for a saddle-type T joint is still absent at present.

SUMMARY

In view of the defects found in the related art, the disclosure aims to provide method of automatically welding a welded seam of a saddle line for a saddle-type T joint for solving the problem that a welding bead, a welding torch pose, and a welding process cannot be jointly planned in a currently-available saddle-type T joint.

To achieve the above, the disclosure provides a method of automatically welding a welded seam of a saddle line for a saddle-type T joint, and the method includes the following steps.

In S1, a groove cross-sectional model is established, a variation law of a groove cross-sectional area is solved, and a welding bead and a welding process parameter are planned according to the groove cross-sectional area.

In S2, a welding torch pose mathematical model is established. A pose homogeneous transformation matrix T of a welding torch is:

$$T = \begin{bmatrix} n_1 & o_1 & a_1 & x_m \\ n_2 & o_2 & a_2 & y_m \\ n_3 & o_3 & a_3 & z_m \\ 0 & 0 & 0 & 1 \end{bmatrix},$$

in the equation, $n_i$, where $i=1$, 2, and 3, is a vector element of a tangent vector $\vec{u}$ of any point on the saddle line, $o_i$, where $i=1$, 2, and 3, is a vector element of a Y-axis direction vector $\vec{v}$ of the welding torch, $a_i$, where $i=1$, 2, and 3, is a vector element of a Z-axis direction vector $\vec{w}$ of the welding torch, and $x_m$, $y_m$, and $z_m$ are translation distances of the welding spot relative to an origin of a robot.

In S3, a three-dimensional model of a main pipe and a branch pipe is established, a welding system is built through offline software, and welding spot pose information is imported in a form of $(x_m, y_m, z_m, w, p, r)$, where w, p, and r are angles of rotation around an x-axis, a y-axis, and a z-axis respectively and are obtained from the pose homogeneous transformation matrix T of the welding torch, and a welding torch pose offline command is generated through the offline software.

In S4, automatic welding of the welded seam of the saddle line for the saddle-type T joint is performed according to the welding bead and the welding process parameter planned in step S1 and the welding torch pose offline command generated in step S3.

In a preferred embodiment, the method of automatically welding the welded seam of the saddle line for the saddle-type T joint further includes the following step. With an intersection position of main pipe and branch pipe axes as an origin, a main pipe axis direction as the X-axis direction, a main pipe radial direction as the Y-axis direction, and a branch pipe axis direction as the Z-axis direction, a coordinate system is established, a saddle line welded seam mathematical model is established under this coordinate system, an angle of inclination at any position of the saddle line is solved, and it is determined whether segmented welding process planning for upward welding and downward welding is required based on the angle of inclination.

In a preferred embodiment, calculation equations of the angle of inclination $\theta$ are:

$$\begin{cases} \theta = \dfrac{\pi}{2} - \cos^{-1}\dfrac{\vec{u}\cdot\vec{n}}{|\vec{u}||\vec{n}|} \\ \vec{u} = \begin{vmatrix} i & j & k \\ 2x_0 & 2y_0 & 0 \\ 0 & 2y_0 & 2z_0 \end{vmatrix} \end{cases},$$

in the equations, $\vec{u}$ is the tangent vector at any position $P_0(x_0, y_0, z_0)$ of the saddle line, $\vec{n}$ is a horizontal plane normal vector $(0, 0, 1)$, and i, j, and k are respectively unit vectors in same directions as X-axis, Y-axis, and Z-axis.

In a preferred embodiment, when the angle of inclination $\theta$ does not exceed $\pm 20°$ at maximum, the segmented welding process planning for upward welding and downward welding is not required to be performed. When the angle of inclination $\theta$ exceeds $\pm 20°$ at maximum, the segmented welding process planning for upward welding and downward welding is required to be performed.

In a preferred embodiment, in S1, the groove cross-sectional area specifically is:

$$S = \dfrac{\delta^2 \tan\beta + \delta\left(n\cdot\sqrt{1-\left(\dfrac{r}{m}\right)^2} - n\cdot\sqrt{1-\left(\dfrac{r+\delta}{m}\right)^2}\right)}{2} - \left(\int_r^{r+\delta} n\cdot\sqrt{1-\left(\dfrac{x_1}{m}\right)^2}dx_1 - \int_r^{r+\delta}\left(\dfrac{n\cdot\sqrt{1-\left(\dfrac{r+\delta}{m}\right)^2} - n\cdot\sqrt{1-\left(\dfrac{r}{m}\right)^2}}{\delta}(x_1-r) + n\cdot\sqrt{1-\left(\dfrac{r}{m}\right)^2}\right)dx_1\right),$$

in the equations, $\delta$ is a wall thickness, $\beta$ is an angle between a horizontal direction of a cross section where a welding spot is located and a groove, n is a semi-minor axis of an ellipse, r is a radius of an inner hole of a branch pipe, m is a semi-major axis of the ellipse, and $x_1$ is an abscissa of $$P_1 = \left(x_1, n\sqrt{1-\left(\dfrac{x_1}{m}\right)^2}\right)$$

at any position on a groove cross section.

In a preferred embodiment, in step S1, when the welding process parameter is planned, it is determined whether $$\dfrac{S_{max} - S_{mix}}{S_{mix}}$$

is greater than a threshold, if yes is determined, a changed welding process parameter is used, if no is determined, the same welding process parameter is used, and then the welding process parameter is determined. $S_{max}$ is a maximum groove cross-sectional area, and $S_{mix}$ is a minimum groove cross-sectional area.

In a preferred embodiment, the threshold is 0.1 to 0.15.

In a preferred embodiment, in step S1, protective gas is pure argon, a gas flow rate is 25 L/min to 30 L/min, dry extension of a welding wire is 12 mm to 15 mm, process parameters of backing welding are: wire feeding speed 8 m/min to 8.5 m/min, welding speed 40 cm/min to 45 cm/min, current 180 A to 195 A, voltage 15.2 V to 16.3 V, and no swing; process parameters of filling welding are: wire feeding speed 8 m/min to 9 m/min, welding speed 30 cm/min to 40 cm/min, current 180 A to 195 A, voltage 15.2 V to 16.3 V, swing amplitude 1 mm to 2 mm, and frequency 3 HZ to 5 HZ; and process parameters of covering welding are: wire feeding speed 9 m/min to 10 m/min, welding speed 30 cm/min to 40 cm/min, current 195 A to 236 A, voltage 16.3 V to 17.6 V, swing amplitude 1.5 mm to 2.5 mm, and frequency 3 HZ to 5 HZ.

In a preferred embodiment, in step S4, during multi-layer and multi-bead welding, a value of r in the welding spot pose information is changed, and an offset distance is set and re-imported into the offline software, and the welding torch pose offline command is regenerated.

In a preferred embodiment, in step S4, the offline software is ROBOGUIDE.

To sum up, the above technical solutions provided by the disclosure have the following beneficial effects compared with the related art.

1. In the disclosure, the pose of the welding torch, welding bead, and the welding process parameters may be jointly planned. In this way, the problem of poor formation of the welded seam due to an excessively large angle of inclination of the saddle line during the welding process may be avoided, or the problem of too much or too little groove filling due to excessive changes in the groove cross-sectional area may also be avoided. This ensures that the welded seam has a favorable appearance, is defect-free, and is suitable for being applied to all saddle-type T welding joints. Further, the automatic welding of the welded seam of the saddle line is achieved in the disclosure based on offline software, so compared to the conventional manual arc welding, the welding efficiency in the disclosure is significantly improved, and the formation quality is stable.

2. Further, considering that the upward welding zone and the downward welding zone are present when the welding gun is welding along the saddle line and the curvature of the saddle line affects the planning of the welding process, by establishing the saddle line welded seam mathematical model and solving the angle of inclination at any position of the saddle line in the disclosure and by determining whether the segmented welding process planning for upward welding and downward welding is required to be performed according to the angle of inclination, defects may be prevented from occurring.

3. Besides, in the disclosure, whether the same welding parameter needs to be used in the welding process is determined based on the variation law of the groove cross-sectional area, so that the welding quality is further improved.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention.

Figure 1:
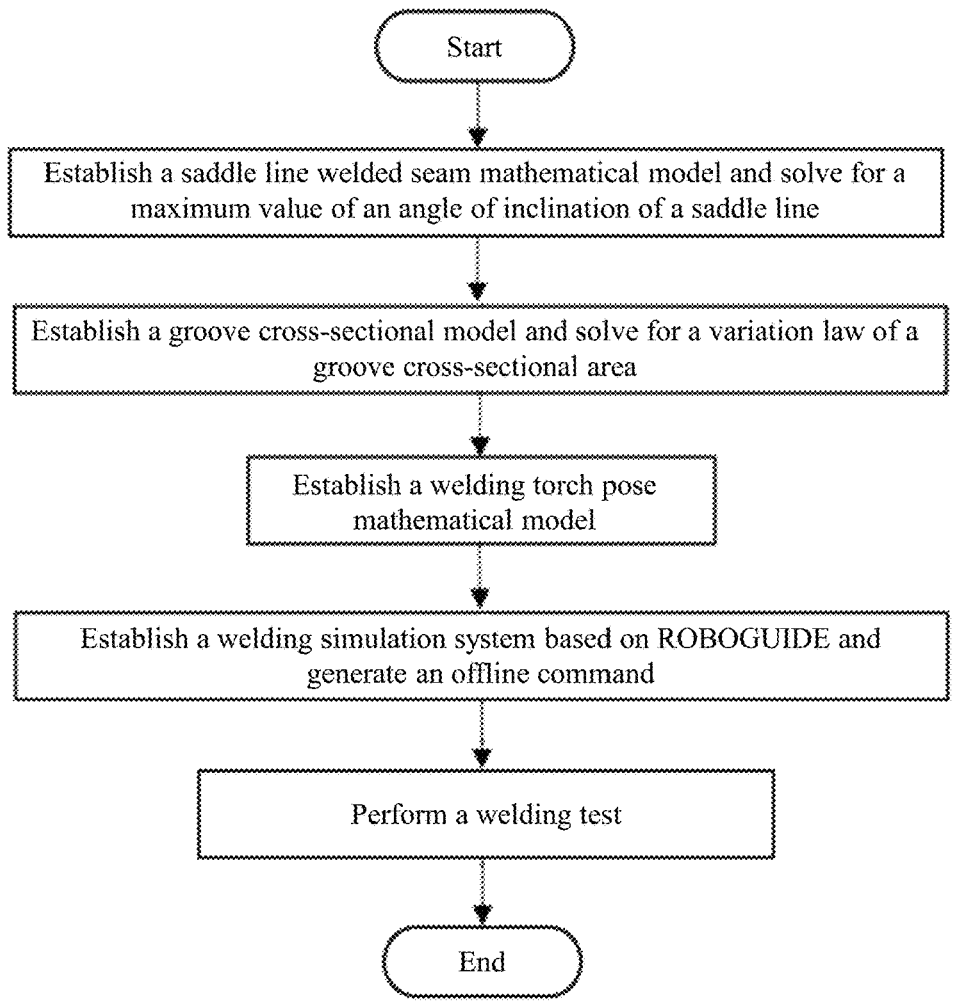
FIG. 1 is a flow chart of a method of automatically welding a welded seam of a saddle line for a saddle-type T joint according to an embodiment of the disclosure.

As shown in FIG. 1, the disclosure provides a method of automatically welding a welded seam of a saddle line for a saddle-type T joint, and the method includes the following steps.

Step One: Establish a Saddle Line Welded Seam Mathematical Model and Solve for an Angle of Inclination at any Position of a Saddle Line With an intersection position of main pipe and branch pipe axes as an origin, a main pipe axis direction as an X-axis direction, a main pipe radial direction as a Y-axis direction, and a branch pipe axis direction as a Z-axis direction, a coordinate system is established, and a saddle line welded seam mathematical model is established under this coordinate system. The entire circle of the saddle line is divided into n coordinate points, and coordinates of any point is $P_0(x_0, y_0, z_0)$, n is greater than or equal to 100.

Curve equations of the saddle line are:

$$\begin{cases} x_0^2 + y_0^2 = r^2 \\ y_0^2 + z_0^2 = R^2 \end{cases} \quad (1)$$

parameter equations of the saddle line are:

$$\begin{cases} x_0 = r\cos t \\ y_0 = r\sin t \\ z_0 = \sqrt{R^2 - r^2 \sin^2 t} \end{cases} \quad (2)$$

in the equations, $t \in (0, 2\pi)$, R is a radius of an outer wall of the main pipe, and r is a radius of an inner hole of the branch pipe.

A position of the welded seam may affect a pose of a welding torch and flowing of a molten pool. When the welding torch welds along the saddle line, an upward welding zone and a downward welding zone are provided.

Therefore, curvature of the saddle line may affect planning of a welding process. A tangent vector at any point $P_0(x_0, y_0, z_0)$ on the saddle line is:

$$\vec{u} = \begin{vmatrix} i & j & k \\ 2x_0 & 2y_0 & 0 \\ 0 & 2y_0 & 2z_0 \end{vmatrix} = \left(y_0, -x_0, \frac{x_0 y_0}{z_0}\right), \quad (3)$$

in the equation, i, j, and k are unit vectors in same directions as the x-axis, Y-axis, and Z-axis respectively. The tangent vector at any point on the saddle line is used as a moving direction of the welding torch, and an angle between the tangent vector at any point on the welded seam and a horizontal plane is defined as θ, then:

$$\theta = \frac{\pi}{2} - \cos^{-1} \frac{\vec{u} \cdot \vec{n}}{|\vec{u}||\vec{n}|}, \quad (4)$$

in the equation, $\vec{n}$ is a normal vector (0, 0, 1) of the horizontal plane.

According to equation (4), the angle of inclination at any point on the saddle line is calculated through software, and it is determined whether a welding process plan for upward welding and downward welding is required based on the angle of inclination. When the angle of inclination θ does not exceed ±20° at maximum, the impact generated by the upward and downward welding on the flowing of the molten pool is not required to be considered. When the angle of inclination θ exceeds ±20° at maximum, it is necessary to consider segmenting an entire circle of the weld bead, and it is necessary to set different welding process parameters in the upward welding zone and the downward welding zone to prevent defects from generating.

Figure 3:
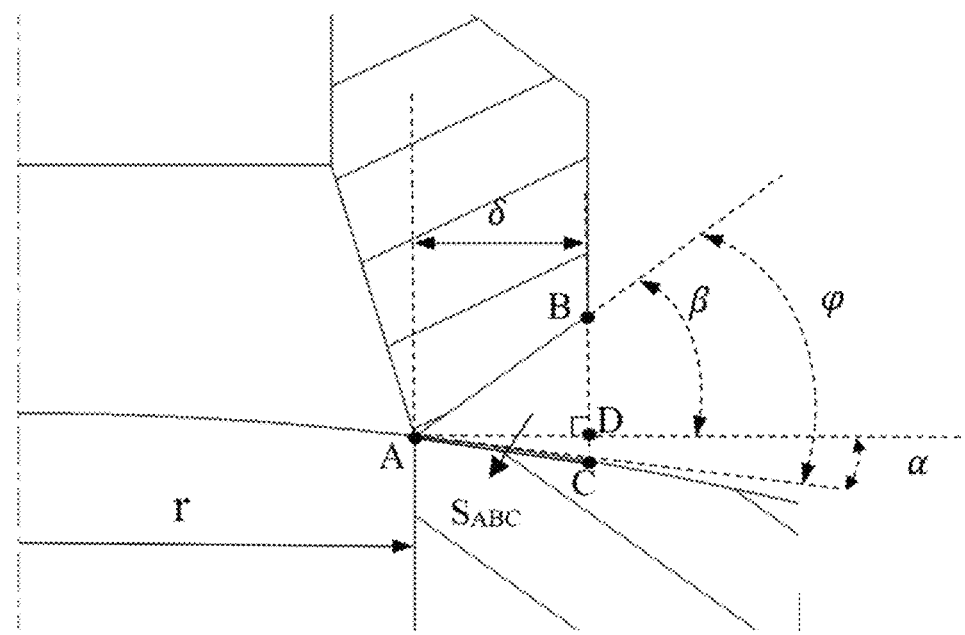
FIG. 3 is a schematic cross-sectional view of a groove according to an embodiment of the disclosure.

Step Two: Establish a Groove Cross-Sectional Model, Solve for a Groove Cross-Sectional Area, and Accordingly Plan a Welding Bead The grooves of most saddle-type branch pipes are equal-angle grooves. That is, an angle φ between a groove straight line at any cross section and a tangent line at the welding spot on the main pipe is a fixed value. Let a be the angle between the tangent line and a horizontal line of a welding spot on the cross section of the main pipe when t is at a specific angle, as shown in FIG. 3, and solve for the groove cross-sectional area S.

Figure 4:
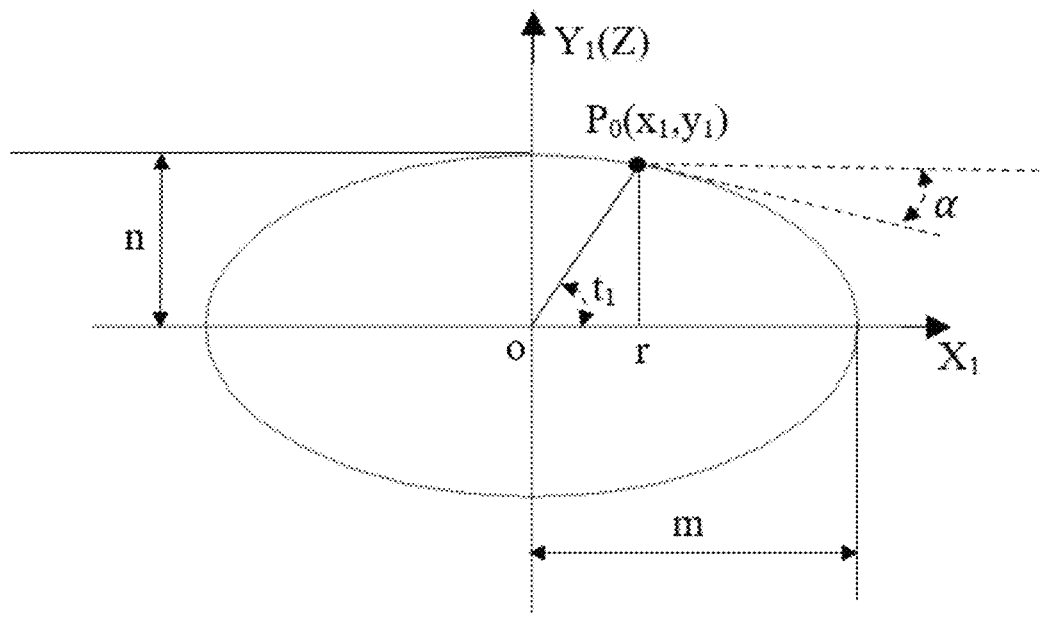
FIG. 4 is a schematic chart of an elliptical curve of the main pipe taken from the cross-sectional view of the groove according to an embodiment of the disclosure.

When t=0 or π, a curve obtained by cutting a cylindrical surface of a large tube from the groove cross section is a perfect circle, and when $$t = \frac{\pi}{2} \text{ or } \frac{3\pi}{2},$$

α is 0°. In other cases, the curve obtained by cutting the cylindrical surface of the large tube from the groove cross section is an ellipse, and a length of a semi-minor axis n of this ellipse is R, a semi-major axis of the ellipse $$m = \frac{R}{\cos t},$$

with O as a center of the circle, the semi-major axis of the ellipse is the $X_1$ axis, and the semi-minor axis of the ellipse is the $Y_1$ axis, and an elliptical coordinate system is established, as shown in FIG. 4.

In the elliptical coordinate system, an equation of the ellipse is:

$$\frac{x_1^2}{m^2} + \frac{y_1^2}{n^2} = 1. \quad (5)$$

The coordinates of any point on the ellipse are $$\left(x_1, n \cdot \sqrt{1-\left(\frac{x_1}{m}\right)^2}\right),$$

and the tangent vector $\vec{u_1}$ of the ellipse at point P is:

$$\vec{u_1} = \left(1, -\frac{n^2 r}{m^2 n \cdot \sqrt{1-\left(\frac{r}{m}\right)^2}}\right). \quad (6)$$

Assuming that the horizontal vector is $\vec{l}=(1,0)$, α can be expressed by equation (7):

$$\alpha = \cos^{-1} \frac{\vec{u_1} \cdot \vec{l}}{|\vec{u_1}||\vec{l}|}, \quad (7)$$

by substituting equation (6) into this equation, the value of a may be obtained.

It is know that β=φ−α, the coordinates of point A $$\left(r, n \cdot \sqrt{1-\left(\frac{r}{m}\right)^2}\right),$$

the coordinates of point $$C\left(r+\delta, n \cdot \sqrt{1-\left(\frac{r+\delta}{m}\right)^2}\right),$$

the line segment BD=δ tan β, AD=δ, δ is the wall thickness, β is the angle between the horizontal direction of the cross section where the welding spot is located and the groove, n is the semi-minor axis of the ellipse, m is the semi-major axis of the ellipse, and r is the radius of the inner hole of the branch pipe.

An area of the triangle ABC is:

$$S_{ABC} = \frac{AD \cdot BC}{2} = \frac{AD \cdot (BD+DC)}{2} = \frac{\delta^2 \tan\beta + \delta\left(n \cdot \sqrt{1-\left(\frac{r}{m}\right)^2} - n \cdot \sqrt{1-\left(\frac{r+\delta}{m}\right)^2}\right)}{2}. \quad (8)$$

Assuming that an area of an arc enclosed by a line segment AC and an elliptical surface is $S_1$, then:

$$S_1 = \int_r^{r+\delta} \left(\frac{n \cdot \sqrt{1-\left(\frac{r+\delta}{m}\right)^2} - n \cdot \sqrt{1-\left(\frac{r}{m}\right)^2}}{\delta}(x_1 - r) + n \cdot \sqrt{1-\left(\frac{r}{m}\right)^2}\right) dx_1. \quad (9)$$

Substituting equations (8) and (9) into equation (10) gives the calculation equation of the groove cross-sectional area:

$$S = S_{ABC} - S_1 = \frac{\delta^2 \tan\beta + \delta\left(n \cdot \sqrt{1-\left(\frac{r}{m}\right)^2} - n \cdot \sqrt{1-\left(\frac{r+\delta}{m}\right)^2}\right)}{2} - \left(\int_r^{r+\delta} n \cdot \sqrt{1-\left(\frac{x_1}{m}\right)^2} dx_1 - \int_r^{r+\delta}\left(\frac{n \cdot \sqrt{1-\left(\frac{r+\delta}{m}\right)^2} - n \cdot \sqrt{1-\left(\frac{r}{m}\right)^2}}{\delta}(x_1 - r) + n \cdot \sqrt{1-\left(\frac{r}{m}\right)^2}\right) dx_1\right). \quad (10)$$

Based on the above, the welding bead and the welding process parameters are planned according to the groove cross-sectional area S.

Step Three: Determine Whether the Same Welding Process Parameters are Used in the Welding Process According to a Variation Law of the Groove Cross-Sectional Area According to equation (10), the variation law of the groove cross-sectional area of the saddle line is calculated through the software, and it is determined whether a changed welding process parameter needs to be used during the welding process. When a difference between a maximum groove cross-sectional area and a minimum groove cross-sectional area is excessively large, using the same welding process parameters may inevitably result in too much or too little filling.

Preferably, when $$\frac{S_{max} - S_{mix}}{S_{mix}} \leq$$

threshold, it can be considered that the maximum groove cross-sectional area and the minimum groove cross-sectional area are not much different, and the same welding process parameters may be used during the welding process. When $$\frac{S_{max} - S_{mix}}{S_{mix}} >$$

threshold, it is considered that the maximum groove cross-sectional area and the minimum groove cross-sectional area are significantly different, so the changed welding process parameter needs to be used in the welding process to avoid overfilling or underfilling of the welded seam due to changes in the groove cross-sectional area, where $S_{max}$ is the maximum groove cross-sectional area, and $S_{mix}$ is the minimum groove cross-sectional area, and the threshold is preferably 0.1 to 0.15.

Step Four: Establish a Welding Torch Pose Mathematical Model

Figure 5:
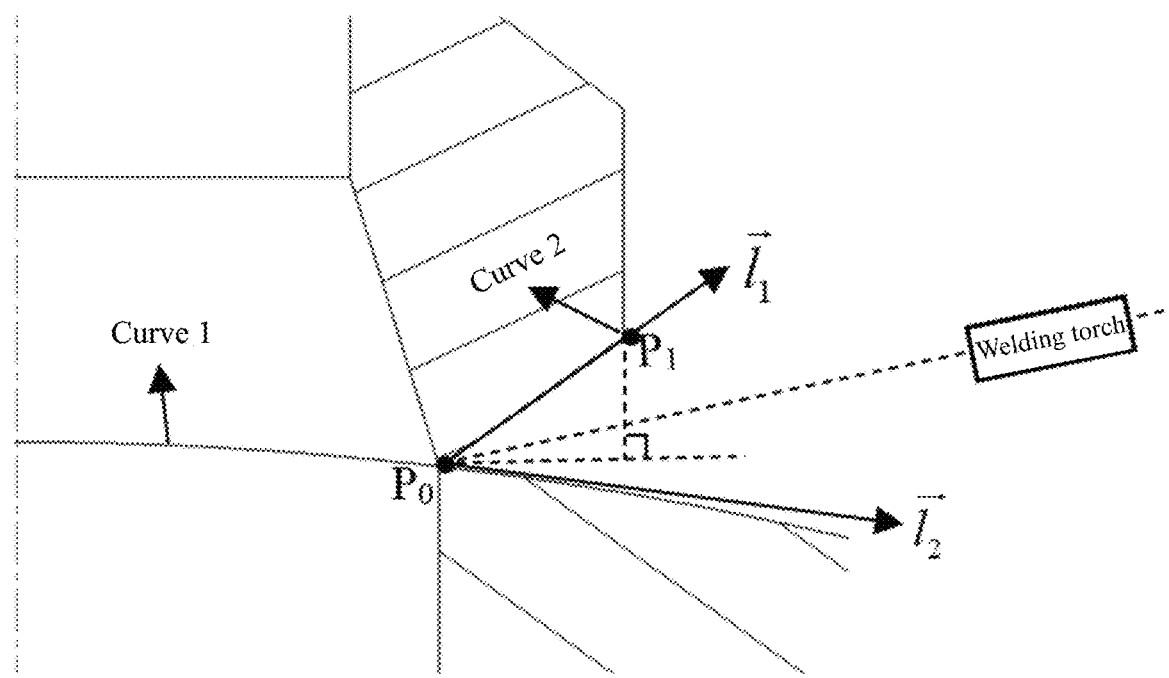
FIG. 5 is a schematic diagram of a pose of a welding torch according to an embodiment of the disclosure.

Assuming that the direction vector of the groove straight line is $\vec{l_1}$, the tangent vector of the welding spot on the cross section of main pipe is $\vec{l_2}$, and the pose of the welding torch shall be located at φ/2. As shown in FIG. 5, curve 1 is the saddle line formed by the intersection of the main pipe and the branch pipe, and its parameter equations are shown in equation (2). Curve 2 is an outer edge of the groove. Assuming that coordinates of the point on curve 2 are $P_1$ ($x_2$, $y_2$, $z_2$), and its parameter equations are:

$$\begin{cases} x_2 = (r+\delta)\cos t \\ y_2 = (r+\delta)\sin t \\ z_2 = \sqrt{R^2 - r^2\sin^2 t} + d \end{cases} \quad (11)$$

in the equations, d=BD, its value is calculated in step two, then:

$$\vec{l_1} = (x_2 - x_0, y_2 - y_0, z_2 - z_0) \quad (12).$$

It is known that the tangent vector of curve 1 at $P_0$ point is equation (3), then the normal plane equation at $P_0$ point is:

$$y_0(x - x_0) - x_0(y - y_0) + \frac{x_0 y_0}{z_0}(z - z_0) = 0, \quad (13)$$

an intersection line $l_2$ between the normal plane and the main pipe is:

$$\begin{cases} y^2 + z^2 = R^2 \\ y_0 x - x_0 y + \frac{x_0 y_0}{z_0} z - x_0 y_0 = 0 \end{cases}, \text{ and} \quad (14)$$

the tangent vector $\vec{l_2}$ of $l_2$ is:

$$\vec{l_2} = \left(\frac{x_0 y_0^2}{z_0} + x_0 z_0, y_0 z_0, -y_0^2\right). \quad (15)$$

An angle bisector direction of the two tangent lines is treated as the Z-axis direction of the welding torch, that is, the axis direction of the welding torch, and its vector $\vec{w}$ is:

$$\vec{w} = \frac{\vec{l_1}}{|\vec{l_1}|} + \frac{\vec{l_2}}{|\vec{l_2}|}. \quad (16)$$

Assuming that the tangent direction of any point on the curve 1 be the walking direction of the welding torch, that is, the X-axis direction of the welding torch, and its vector expression is shown in equation (3). The Y-axis direction vector of the welding torch is determined according to the right-hand rule, that is:

$$\vec{v} = \vec{w} \times \vec{u} \quad (17),$$

then, a pose homogeneous transformation matrix of the welding torch is:

$$T = \begin{bmatrix} n_1 & o_1 & a_1 & x_m \\ n_2 & o_2 & a_2 & y_m \\ n_3 & o_3 & a_3 & z_m \\ 0 & 0 & 0 & 1 \end{bmatrix}, \quad (18)$$

in the equation, $n_i$, where i=1, 2, and 3, is a vector element of a tangent vector $\vec{u}$ of any point on the saddle line, $o_i$, where i=1, 2, and 3, is a vector element of a Y-axis direction vector $\vec{v}$ of the welding torch, $a_i$, where i=1, 2, and 3, is a vector element of a Z-axis direction vector $\vec{w}$ of the welding torch, and $x_m$, $y_m$, and $z_m$ are translation distances of the welding spot relative to an origin of a robot.

Step Five: Establish a Welding Simulation System Based on ROBOGUIDE and Generate a Welding Torch Pose Offline Command An assembly three-dimensional model of the main pipe and the branch pipe is established through three-dimensional modeling software, saved in IGS format and, then imported into a WeldPRO module of ROBOGUIDE, and a welding system is built in this module. The welding system includes a robot, a welding torch, a workpiece, and a corresponding fixture.

In ROBOGUIDE, the welding spot pose information is imported in the form of ($x_m$, $y_m$, $z_m$, w, p, r), where w, p, and r are the angles of rotation around the x, y, and z axes respectively, which may be obtained according to equation (18) and through a two-parameter arctangent function, and $x_m$, $y_m$, and $z_m$ are translation distances of the welding spots relative to an origin of the robot, which are determined according to the relative position of the established model. A data file needs to be saved in CSV format when saving. In the browsing tree on the left side of ROBOGUIDE, right-click the target point "Targets", select "Export Point Data" in the pop-up shortcut menu, then import the CSV file to obtain the generated coordinate points, use the "Target Groups" function to set all coordinate points into a set and set the welding speed, and then generate the welding torch pose offline command.

Further, during multi-layer and multi-bead welding, a value of r in the welding spot pose information is changed, and an offset distance is set and re-imported into the offline software, and the welding torch pose offline command is regenerated.

Step Six: Perform Automated Welding

According to the welding bead planned in step two, the welding process parameter planned in step three, and the welding torch pose offline command generated in step five, automatic welding of the saddle line welded seam of the saddle-type T joint is performed.

Before formal welding, the offline command for each welding bead in ROBOGUIDE is generated, saved in TP format, and imported into a control cabinet of the robot, and the branch pip is fixed on the main pipe through a spot welding command.

On the welding equipment and robot teach pendant, the welding process parameters are set, and the welding process is MIG welding. The above welding process parameters include: backing welding: wire feeding speed 8 m/min to 8.5 m/min, welding speed 40 cm/min to 45 cm/min, current 180 A to 195 A, voltage 15.2 V to 16.3 V, no swing;

filling welding: wire feeding speed 8 m/min to 9 m/min, welding speed 30 cm/min to 40 cm/min, current 180 A to 195 A, voltage 15.2 V to 16.3 V, swing amplitude 1 mm to 2 mm, and frequency 3 HZ to 5 HZ; and covering welding: wire feeding speed 9 m/min to 10 m/min, welding speed 30 cm/min to 40 cm/min, current 195 A to 236 A, voltage 16.3 V to 17.6 V, swing amplitude 1.5 mm to 2.5 mm, and frequency 3 HZ to 5 HZ. Protective gas is pure argon, a gas flow rate is 25 L/min to 30 L/min, and further, dry extension of a welding wire is 12 mm to 15 mm.

Further, in step six, electric welding shall fix at least four positions symmetrically. Among the welding process parameters, the welding speed is stored in the offline command, and the remaining welding process parameters are modified on the welding equipment. The welding equipment is CMT 4000 Advanced produced by FRONIUS Company, and the welding wire is ERNiCrMo-3 with a diameter of 1.14 mm.

The technical solutions provided by the disclosure are further described in detail according to the following specific embodiments.

Example 1

The disclosure is further described together with accompanying drawings and specific embodiments in the following paragraphs.

In order to verify the specific implementation of the disclosure, the established mathematical model is calculated and verified using Matlab software, a FANUC M-10iA six-degree-of-freedom arc welding robot is used to carry out a welding test, and the model of the fixed welding torch at the end of the robot is FRONIUS RA 280 36G. The radius R of the main pipe used in the test is 267.5 mm, and the radius r of the inner hole of the branch pipe is 31 mm.

FIG. 1 shows a method of automatically welding a welded seam of a saddle line for a saddle-type T joint, and the method includes the following steps.

Figure 2:
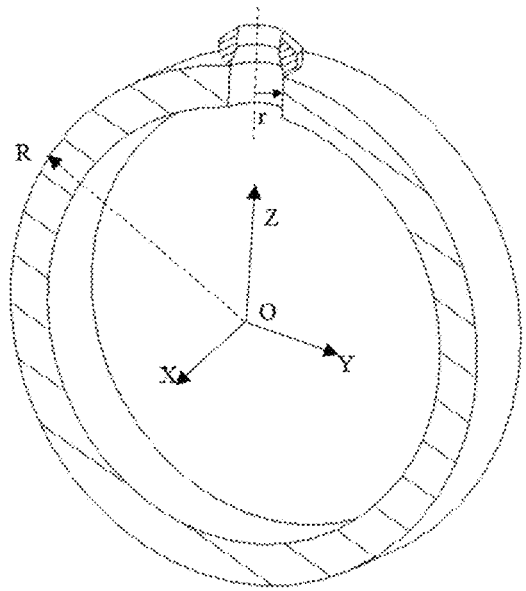
FIG. 2 is a schematic view of assembly of a main pipe and a branch pipe and a coordinate system according to an embodiment of the disclosure.

In step one, with an intersection position of main pipe and branch pipe axes as an origin, a main pipe axis direction as an X-axis direction, a main pipe radial direction as a Y-axis direction, and a branch pipe axis direction as a Z-axis direction, a coordinate system is established, and as shown in FIG. 2, the curve equations for establishing the welded seam of the saddle line are:

$$\begin{cases} x_0^2 + y_0^2 = 31^2 \\ y_0^2 + z_0^2 = 267.5^2 \end{cases},$$

parameter equations are:

$$\begin{cases} x_0 = 31\cos t \\ y_0 = 31\sin t \\ z_0 = \sqrt{267.5^2 - 31^2\sin^2 t} \end{cases}.$$

Figure 6:
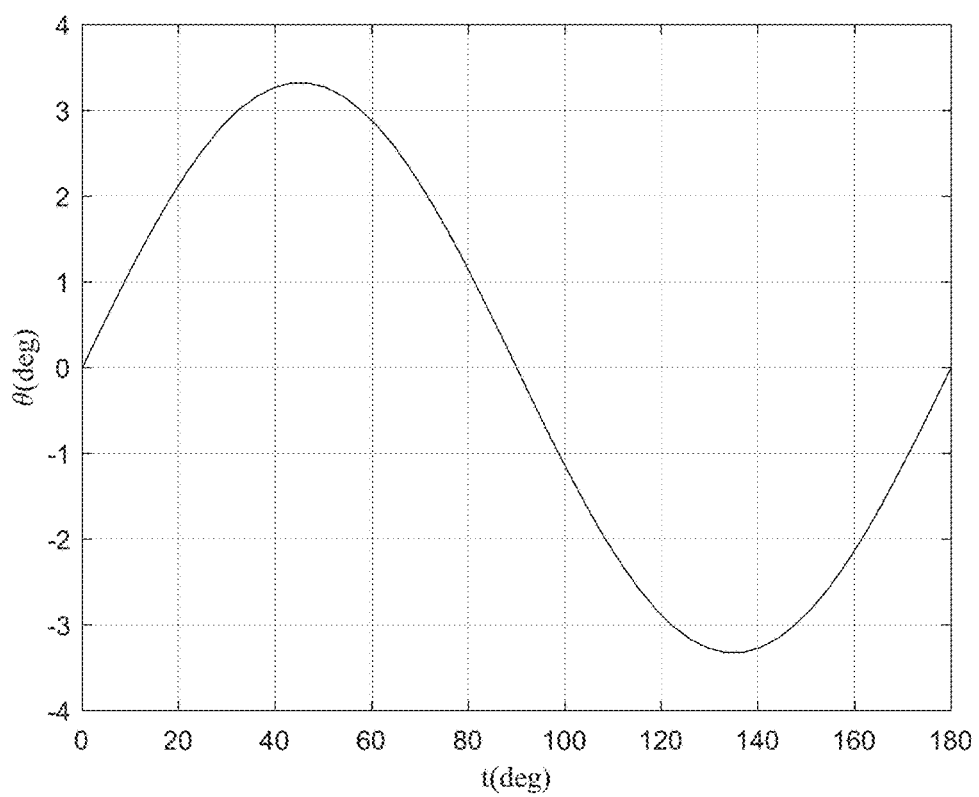
FIG. 6 is a curve of an angle of inclination θ of a welded seam changing with t according to an embodiment of the disclosure.

The interval of t is set as $$\frac{\pi}{50},$$

and the entire circle of the saddle line is divided into 100 points. According to equations (3) and (4), the angle between the tangent vector and the horizontal plane at any point on the welded seam is calculated through Matlab software. As shown in FIG. 6, a maximum angle of inclination of the welded seam does not exceed ±4°, so the influence of the upward and downward positions of the welded seam on the flowing of the molten pool is not considered.

In step two, the groove cross-sectional model is established, and the variation law of the groove cross-sectional area is solved. As shown in FIG. 2, the branch pipe used in this test has an equal-angle groove, φ is 42°, and the wall thickness δ of the branch pipe is 13.5 mm. The semi-minor axis of the curved ellipse obtained by cutting the cylindrical surface of the large pipe at the groove cross section is n=267.5 mm, and the semi-major axis is $$m = \frac{267.5}{\cos t}.$$

Figure 7:
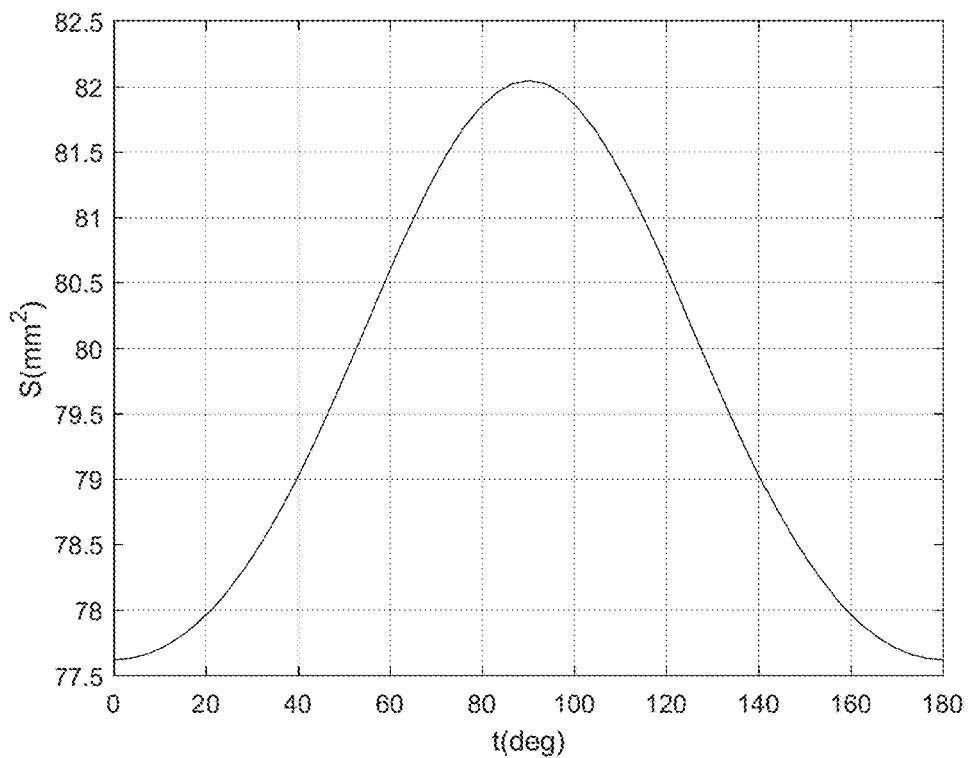
FIG. 7 is a curve of a groove cross-sectional area changing with t according to an embodiment of the disclosure.

According to equations (5), (6), and (7), the values of a and B are calculated first, according to equations (8), (9), and (10), the relational expression of groove cross-sectional area S changing with t is then obtained, and the groove cross section S changing with t is drawn through Matlab, as shown in FIG. 7.

It can be seen from the figure that the groove cross-sectional area reaches the minimum value of 77.62 mm² at t=0° and reaches the maximum value of 82.05 mm² at t=90°, then $$\frac{S_{max} - S_{mix}}{S_{mix}} = \frac{82.05 - 77.62}{77.62} = 0.057 < 0.1.$$

The groove cross-sectional area does not change much, and the same welding process parameters may be used during the welding process.

In step three, a welding torch pose mathematical model is established.

Figure 8:
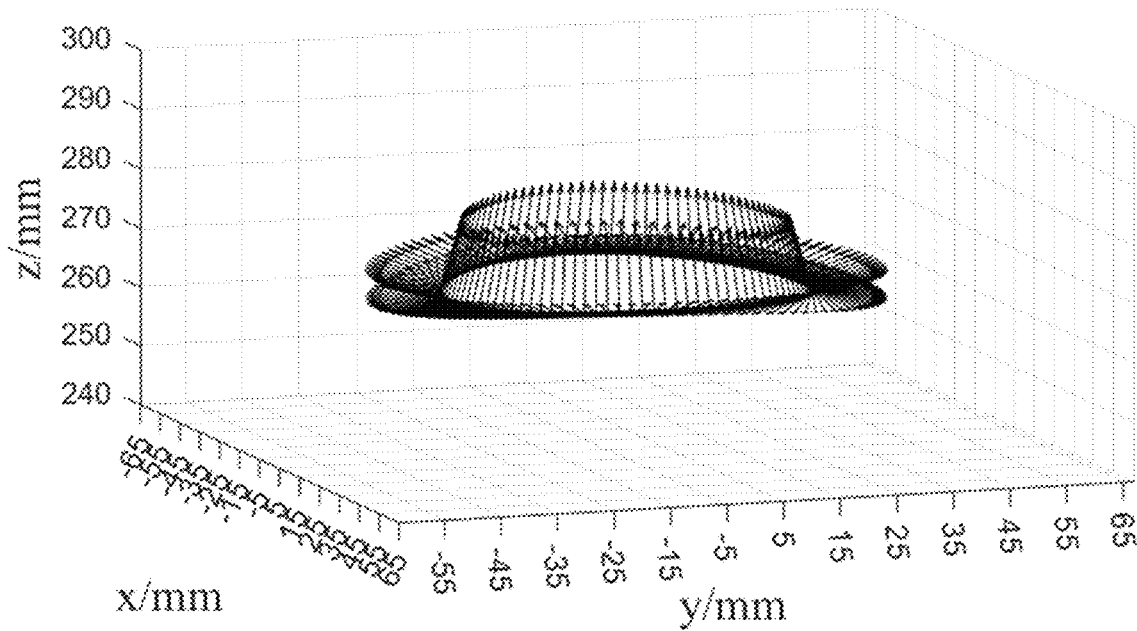
FIG. 8 is a welding torch pose mathematical model according to an embodiment of the disclosure.

According to equations (11), (12), (13), and (14), the direction vector $\vec{l_1}$, of the groove straight line and the tangent vector $\vec{l_2}$, of the welding spot on the cross section of the main pipe are calculated, and according to equation (16), the Z-axis direction vector of the welding torch coordinate system is solved. Assuming that the tangent direction of any point on curve 1 be the walking direction of the welding torch, that is, the X-axis direction of the welding torch, and the Y-axis direction vector of the welding torch is calculated according to equation (17), and the pose of the welding torch is finally obtained as shown in FIG. 8. By substituting the obtained element of each axis direction vector into equation (18), the homogeneous transformation matrix T of the pose of the welding torch relative to the world coordinate system may be obtained.

In step four, a welding simulation system is established based on ROBOGUIDE, and an offline command is generated.

An assembly three-dimensional model of the main pipe and the branch pipe is established through three-dimensional modeling software, saved in IGS format and, then imported into a WeldPRO module of ROBOGUIDE, and a welding system is built in this module. The welding system includes a robot, a welding torch, a workpiece, and a corresponding fixture.

According to the homogeneous transformation matrix T and by using the two-parameter arctangent function, the angles of rotation w, p, and r of the pose of the welding torch around the x, y, and z axes of the world coordinate system are obtained. Further, according to the relative position between the robot origin position and the workpiece, the values of $x_m$, $y_m$, and $z_m$ are set, and the pose information of some spots is solved, as shown in Table 1.

TABLE 1 pose information of some welding spots

| Welding spot number | $x_m$ (mm) | $y_m$ (mm) | $z_m$ (mm) | w (deg) | p (deg) | r (deg) |
|---|---|---|---|---|---|---|
| 1 | −4009.29 | −63.271 | 1153.198 | 0 | −72.97648 | 90 |
| 2 | −4011.29 | −63.228 | 1153.205 | 1.61895 | −72.92451 | 84.52451 |
| 3 | −4013.28 | −63.075 | 1153.223 | 3.21042 | −72.87696 | 79.49917 |
| 4 | −4015.26 | −62.797 | 1153.255 | 4.65439 | −72.83383 | 74.59163 |
| 5 | −4017.22 | −62.393 | 1153.301 | 5.95085 | −72.79511 | 69.80187 |
| ... | ... | ... | ... | ... | ... | ... |
| 40 | −4029.47 | −8.472 | 1153.939 | −11.2336 | −72.6221 | −38.9627 |
| 41 | −4027.9 | −7.236 | 1153.826 | −10.8293 | −72.6376 | −43.1601 |
| 42 | −4026.26 | −6.101 | 1153.717 | −10.1589 | −72.6621 | −47.8071 |
| 43 | −4024.55 | −5.071 | 1153.614 | −9.59076 | −72.6798 | −52.0259 |
| 44 | −4022.78 | −4.152 | 1153.519 | −8.87363 | −72.7024 | −56.3669 |
| ... | ... | ... | ... | ... | ... | ... |

The welding spot pose data file is saved in CSV format. In the browsing tree on the left side of ROBOGUIDE, right-click the target point "Targets", select "Export Point Data" in the pop-up shortcut menu, then import the CSV file to obtain the generated coordinate points, use the "Target Groups" function to set all coordinate points into a set and set the welding speed, and then generate the offline command.

In step five, the process parameters are set, and the welding test is performed.

Figure 9:
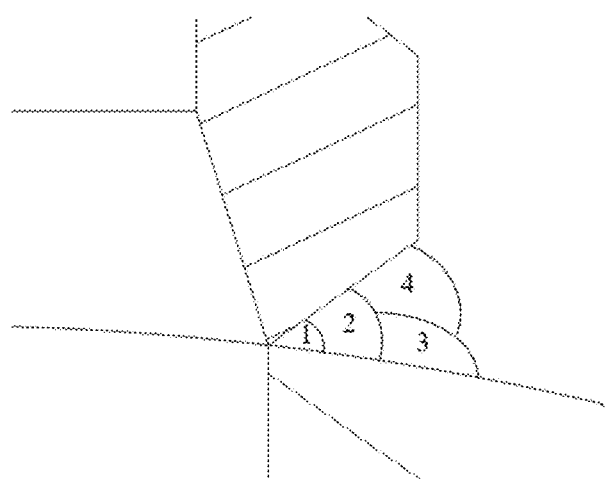
FIG. 9 is a schematic view of welding bead planning according to an embodiment of the disclosure.

Before formal welding, the welding bead is planned according to the groove cross-sectional area, and there are three layers and four beads in total, as shown in FIG. 9. In ROBOGUIDE, the offline command of each welding bead is generated, saved in TP format, and then imported into the control cabinet of the robot, the branch pipe is fixed on the main pipe using the spot welding command, a spot is spot welded every 90°, and there are a total of four spots.

The maximum angle of inclination θ of the weld seam calculated in step one does not exceed 20°, and the upward and downward welding bead planning is not required to be performed. If $$\frac{S_{max} - S_{mix}}{S_{mix}} < 0.1$$

in step two, it is not necessary to use the changed welding process parameter during the welding process.

On the CMT 4000 Advanced welding machine, the following process parameters are set, among which the welding speed parameter is stored in the offline command:
  backing welding bead 1: wire feeding speed 8 m/min, welding speed 40 cm/min, current 180 A, voltage 15.2 V, no swing;
  filling welding bead 2: wire feeding speed 8 m/min, welding speed 35 cm/min, current 180 A, voltage 15.2 V, swing amplitude 1 mm, and frequency 4 HZ;
  covering welding bead 3: wire feeding speed 9.4 m/min, welding speed 35 cm/min, current 219A, voltage 16.9 V, swing amplitude 2 mm, and frequency 4 HZ; and
  covering welding bead 4: wire feeding speed 9.4 m/min, welding speed 35 cm/min, current 219A, voltage 16.9 V, swing amplitude 2 mm, and frequency 4 HZ.

The welding wire used in the test is ERNiCrMo-3 with a diameter of 1.14 mm. The protective gas is pure argon, and the gas flow rate is 25 L/min.

Figure 10:
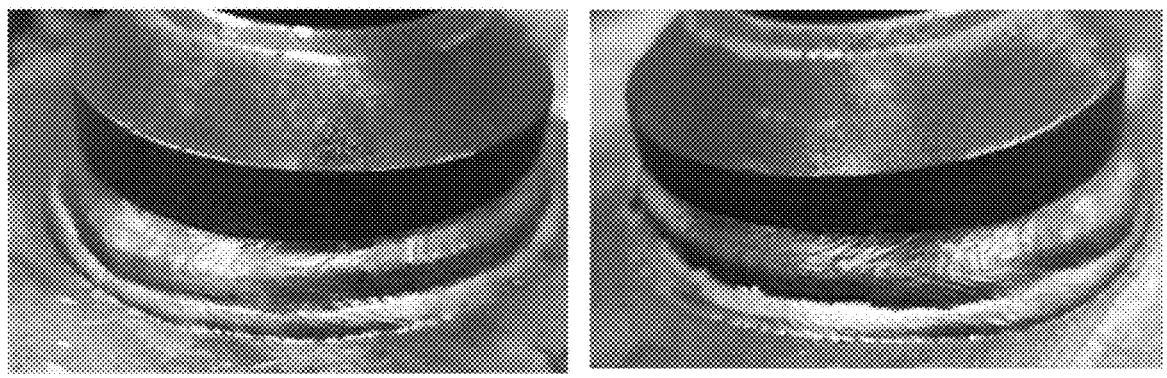
FIG. 10 is an effect picture of welded seam formation of example 1.

The resulting welded seam has a favorable shape and no internal defects, as shown in FIG. 10.

Example 2

The radius R of the main pipe is 267.5 mm, the radius r of the inner hole of the branch pipe r is 40 mm, and other conditions are the same as in Example 1.

In step one, r in Example 1 is changed to 40 mm. The interval of t is set as $$\frac{\pi}{50},$$

and the entire circle of the saddle line is divided into 100 points. The calculated maximum angle of inclination of the welded seam does not exceed ±8°, so the influence of the upward and downward positions of the welded seam on the flowing of the molten pool is not considered.

In step two, the calculated groove cross-sectional area reaches the minimum value of 64.95 mm² at t=0° and reaches the maximum value of 82.05 mm² at t=90°, then $$\frac{S_{max} - S_{mix}}{S_{mix}} = \frac{82.05 - 64.95}{64.95} = 0.26 > 0.1,$$

and the groove cross-sectional area changes considerably.
Step three is the same as Example 1.
Step four is the same as Example 1.
In step five, the maximum angle of inclination θ of the weld seam calculated in step one does not exceed 20°, and the upward and downward welding bead planning is not required to be $$\frac{S_{max} - S_{mix}}{S_{mix}} > 0.1$$

performed. If in step two, it is necessary to use the changed welding process parameter during the welding process.

According to the changes in the groove cross-sectional area, the filling of the groove is achieved by continuously changing the welding speed during the welding process to avoid excessive filling or underfilling of the welded seam caused by using a single welding speed.

On the CMT 4000 Advanced welding machine, the following process parameters are set, among which the welding speed parameter is stored in the offline command:

backing welding bead 1: wire feeding speed 8 m/min, welding speed 40 cm/min to 45 cm/min, current 180 A, voltage 15.2 V, no swing;

filling welding bead 2: wire feeding speed 8 m/min, welding speed 35 cm/min to 40 cm/min, current 180 A, voltage 15.2V, swing amplitude 1 mm, and frequency 4 HZ;

covering welding bead 3: wire feeding speed 9.4 m/min, welding speed 35 cm/min to 40 cm/min, current 219 A, voltage 16.9 V, swing amplitude 2 mm, and frequency 4 HZ; and covering welding bead 4: wire feeding speed 9.4 m/min, welding speed 35 cm/min to 40 cm/min, current 219 A, voltage 16.9 V, swing amplitude 2 mm, and frequency 4 HZ.

The welding wire used in the test is ERNiCrMo-3 with a diameter of 1.14 mm. The protective gas is pure argon, and the gas flow rate is 25 L/min.

Figure 11:
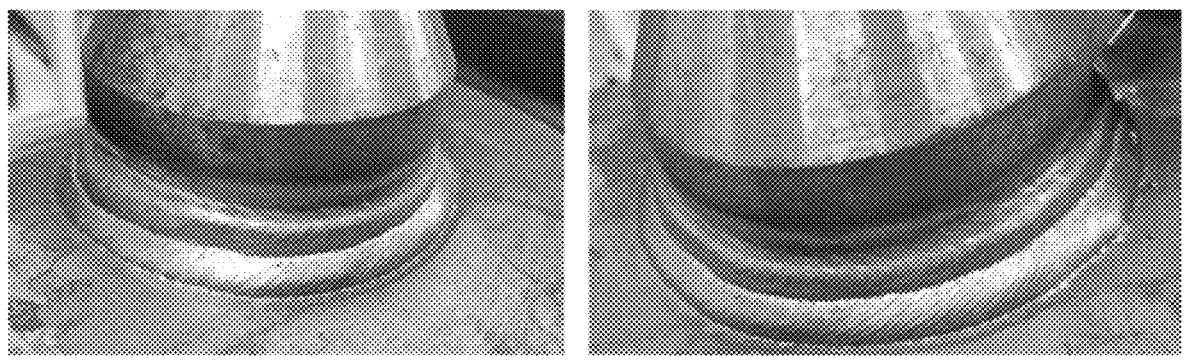
FIG. 11 is an effect picture of welded seam formation of example 2.

The resulting welded seam has a favorable shape and no internal defects, as shown in FIG. 11.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A method of automatically welding a welded seam of a saddle line for a saddle-type T joint, comprising:

S1: establishing a groove cross-sectional model, solving a variation law of a groove cross-sectional area, and planning a welding bead and a welding process parameter according to the groove cross-sectional area, wherein the groove cross-sectional area specifically is:

$$S = \frac{\delta^2 \tan\beta + \delta\left(n \cdot \sqrt{1-\left(\frac{r}{m}\right)^2} - n \cdot \sqrt{1-\left(\frac{r+\delta}{m}\right)^2}\right)}{2} - \left(\int_r^{r+\delta} n \cdot \sqrt{1-\left(\frac{x_1}{m}\right)^2} dx_1 - \int_r^{r+\delta}\left(\frac{n \cdot \sqrt{1-\left(\frac{r+\delta}{m}\right)^2} - n \cdot \sqrt{1-\left(\frac{r}{m}\right)^2}}{\delta}(x_1 - r) + n \cdot \sqrt{1-\left(\frac{r}{m}\right)^2}\right) dx_1\right)$$

in the equations, $\delta$ is a wall thickness, $\beta$ is an angle between a horizontal direction of a cross section where a welding spot is located and a groove, n is a semi-minor axis of an ellipse, r is a radius of an inner hole of a branch pipe, m is a semi-major axis of the ellipse, and $x_1$ is an abscissa of $$P_1 = \left(x_1, n\sqrt{1-\left(\frac{x_1}{m}\right)^2}\right)$$

at any position on a groove cross section;
determining whether $$\frac{S_{max} - S_{mix}}{S_{mix}}$$

is greater than a threshold when the welding process parameter is planned, using a changed welding process parameter if yes is determined, using the same welding process parameter if no is determined, and then determining the welding process parameter, wherein $S_{max}$ is a maximum groove cross-sectional area, $S_{mix}$ is a minimum groove cross-sectional area, the threshold is 0.1 to 0.15, the welding process parameter includes: a protective gas is pure argon, a gas flow rate is 25 L/min to 30 L/min, a dry extension of a welding wire is 12 mm to 15 mm, process parameters of backing welding are: a wire feeding speed 8 m/min to 8.5 m/min, a welding speed 40 cm/min to 45 cm/min, a current 180 A to 195 A, a voltage 15.2 V to 16.3 V, and no swing; process parameters of filling welding are: a wire feeding speed 8 m/min to 9 m/min, a welding speed 30 cm/min to 40 cm/min, a current 180 A to 195 A, a voltage 15.2 V to 16.3 V, a swing amplitude 1 mm to 2 mm, and a frequency 3 HZ to 5 HZ; and process parameters of covering welding are: a wire feeding speed 9 m/min to 10 m/min, a welding speed 30 cm/min to 40 cm/min, a current 195 A to 236 A, a voltage 16.3 V to 17.6 V, a swing amplitude 1.5 mm to 2.5 mm, and a frequency 3 HZ to 5 HZ;

S2: establishing a welding torch pose mathematical model, wherein a pose homogeneous transformation matrix T of a welding torch is:

$$T = \begin{bmatrix} n_1 & o_1 & a_1 & x_m \\ n_2 & o_2 & a_2 & y_m \\ n_3 & o_3 & a_3 & z_m \\ 0 & 0 & 0 & 1 \end{bmatrix},$$

in the equation, $n_i$, where i=1, 2, and 3, is a vector element of a tangent vector $\vec{u}$ of any point on the saddle line, $o_i$, where i=1, 2, and 3, is a vector element of a Y-axis direction vector $\vec{v}$ of the welding torch, $a_i$, where i=1, 2, and 3, is a vector element of a Z-axis direction vector $\vec{w}$ of the welding torch, and $x_m$, $y_m$, and $z_m$ are translation distances of the welding spot relative to an origin of a robot, wherein a direction vector of a groove straight line is $\vec{l_1}$, a tangent vector on a cross section of a main pipe where the welding spot is located is $\vec{l_2}$, a pose of the welding torch is located at $$\frac{\varphi}{2},$$

$\varphi$ is an angle between the groove straight line at any cross section and a tangent line at the welding spot on the main pipe, the Z-axis direction vector of the welding torch is $$\frac{\vec{l_1}}{|\vec{l_1}|} + \frac{\vec{l_2}}{|\vec{l_2}|},$$

an X-axis direction vector of the welding torch is a tangent direction of any point on the saddle line formed by intersection of the main pipe and the branch pipe, and the Y-axis direction vector of the welding torch is determined according to the right-hand rule of the Z-axis direction vector of the welding torch and the X-axis direction vector of the welding torch;

S3: establishing a three-dimensional model of the main pipe and the branch pipe, building a welding system through an offline software, and importing a welding spot pose information in a form of ($x_m$, $y_m$, $z_m$, w, p, r), wherein w, p, and r are angles of rotation around an X-axis, a Y-axis, and a Z-axis respectively and are obtained from the pose homogeneous transformation matrix T of the welding torch, and a welding torch pose offline command is generated through the offline software; and S4: performing automatic welding of the welded seam of the saddle line for the saddle-type T joint according to the welding bead and the welding process parameter planned in step S1 and the welding torch pose offline command generated in step S3.

2. The method of automatically welding the welded seam of the saddle line for the saddle-type T joint according to claim 1, further comprising: establishing a coordinate system with an intersection position of a main pipe axis and a branch pipe axis as an origin, a main pipe axis direction as an X-axis direction, a main pipe radial direction as a Y-axis direction, and a branch pipe axis direction as a Z-axis direction, establishing a saddle line welded seam mathematical model under the coordinate system, solving an angle of inclination at any position of the saddle line, and determining whether a segmented welding process planning for upward welding and downward welding is required based on the angle of inclination.

3. The method of automatically welding the welded seam of the saddle line for the saddle-type T joint according to claim 2, wherein a calculation equation of the angle of inclination θ is:

$$\begin{cases} \theta = \frac{\pi}{2} - \cos^{-1} \frac{\vec{u} \cdot \vec{n}}{|\vec{u}||\vec{n}|} \\ \vec{u} = \begin{vmatrix} i & j & k \\ 2x_0 & 2y_0 & 0 \\ 0 & 2y_0 & 2z_0 \end{vmatrix} \end{cases},$$

in the equation, $\vec{u}$ is the tangent vector at any position P0(x0, y0, z0) of the saddle line, $\vec{n}$ is a horizontal plane normal vector (0, 0, 1), and i, j, and k are respectively unit vectors in same directions as the X-axis, the Y-axis, and the Z-axis.

4. The method of automatically welding the welded seam of the saddle line for the saddle-type T joint according to claim 3, wherein the segmented welding process planning for upward welding and downward welding is not required to be performed when the angle of inclination θ does not exceed ±20° at maximum, and the segmented welding process planning for upward welding and downward welding is required to be performed when the angle of inclination θ exceeds ±20° at maximum.

5. The method of automatically welding the welded seam of the saddle line for the saddle-type T joint according to claim 1, wherein in step S4, during multi-layer and multi-bead welding, a value of r in the welding spot pose information is changed, and an offset distance is set and re-imported into the offline software, and the welding torch pose offline command is regenerated.

* * * * *